(12) United States Patent
Mehta et al.

(10) Patent No.: US 10,902,687 B2
(45) Date of Patent: Jan. 26, 2021

(54) POWER TRANSFER UNIT MAINTENANCE (71) Applicant: GKN Automotive Ltd., Redditch (GB)

(72) Inventors: Himanshu Mehta, Auburn Hills, MI (US); Zihao Zhu, Troy, MI (US)

(73) Assignee: GKN Automotive Ltd., Redditch (GB)

(*) Notice: Subject to any disclaimer, the term of this patent is extended or adjusted under 35 U.S.C. 154(b) by 311 days.

(21) Appl. No.: 15/886,197

(22) Filed: Feb. 1, 2018

(65) Prior Publication Data
US 2019/0236855 A1    Aug. 1, 2019

(51) Int. Cl.
*G07C 5/00*    (2006.01)
*G01C 22/00*    (2006.01)
*B60K 23/08*    (2006.01)
*B60W 30/18*    (2012.01)

(52) U.S. Cl.
CPC .......... *G07C 5/006* (2013.01); *B60K 23/0808* (2013.01); *G01C 22/00* (2013.01); *B60K 2023/0833* (2013.01); *B60K 2023/0858* (2013.01); *B60W 30/18* (2013.01); *B60W 30/18009* (2013.01)

(58) Field of Classification Search
CPC ........ B60K 23/0808; B60K 2023/0833; B60K 2023/0858; G07C 5/006; G01C 22/00
USPC .......................... 701/32.8, 34.4, 69; 703/7–8
See application file for complete search history.

(56) References Cited

U.S. PATENT DOCUMENTS

| | | | | |
|---|---|---|---|---|
| 3,703,092 A | * | 11/1972 | Elliott | B60R 25/007 70/248 |
| 5,072,629 A | * | 12/1991 | Hirukawa | B63H 21/213 338/47 |
| 5,411,110 A | * | 5/1995 | Wilson | B60K 23/08 180/233 |
| 5,699,870 A | * | 12/1997 | Warren | F16H 61/32 180/247 |
| 6,374,691 B1 | * | 4/2002 | Grundberg | B63H 21/213 440/86 |
| 7,258,648 B2 | * | 8/2007 | Smith | F16D 48/06 318/433 |
| 7,322,436 B2 | * | 1/2008 | Gady | B60K 17/344 180/197 |
| 7,813,857 B2 | * | 10/2010 | Mizon | B60K 23/0808 192/54.1 |
| 7,873,457 B2 | * | 1/2011 | Christofl | B60K 17/3462 701/67 |
| 7,908,063 B2 | * | 3/2011 | Sah | B60W 20/40 701/51 |

(Continued)

OTHER PUBLICATIONS

Analysis and coordinated control of mode transition and shifting for a full hybrid electric vehicle based on dual clutch transmissions Z Lei, D Sun, Y Liu, D Qin, Y Zhang, Y Yang . . . —Mechanism and Machine . . . , 2017—Elsevier (Year: 2017).*

(Continued)

*Primary Examiner* — Cuong H Nguyen (74) *Attorney, Agent, or Firm* — Bejin Bieneman PLC (57) ABSTRACT A system is described, as well as methods of using the system. The method may include: determining at least one of the following: a communication error, a read-memory error, or an absence of a PTU shift between a two-wheel drive (2WD) mode and an all-wheel drive (AWD) mode for a threshold amount of vehicle operation; determining that a vehicle ignition state is not in a RUN state; and executing the task.

19 Claims, 7 Drawing Sheets

(56) References Cited

U.S. PATENT DOCUMENTS

| | | | | |
|---|---|---|---|---|
| 8,285,432 B2* | 10/2012 | Heap | ................ | B60W 50/04 701/22 |
| 8,712,651 B2* | 4/2014 | Kubina | ................ | F16H 61/70 701/54 |
| 8,738,256 B2* | 5/2014 | Connolly | ................ | F16D 48/064 701/68 |
| 9,031,722 B2* | 5/2015 | Doering | ................ | B60W 20/10 701/22 |
| 10,017,173 B2* | 7/2018 | Kim | ................ | B60W 20/13 |
| 2005/0233858 A1* | 10/2005 | Smith | ................ | F16D 48/06 477/175 |
| 2008/0004783 A1* | 1/2008 | Mizon | ................ | B60K 23/0808 701/67 |
| 2009/0082934 A1* | 3/2009 | Mizon | ................ | B60K 23/0808 701/68 |
| 2010/0292901 A1* | 11/2010 | Ortmann | ................ | B60K 6/442 701/67 |
| 2011/0137534 A1* | 6/2011 | Kim | ................ | F16H 59/105 701/62 |
| 2013/0331226 A1* | 12/2013 | Eo | ................ | F16H 37/021 476/54 |
| 2013/0338887 A1* | 12/2013 | Kubina | ................ | F16H 61/70 701/54 |
| 2014/0007728 A1* | 1/2014 | Kim | ................ | F16H 61/12 74/473.12 |
| 2014/0067217 A1* | 3/2014 | Stares | ................ | B60K 23/0808 701/69 |
| 2014/0067218 A1* | 3/2014 | Stares | ................ | B60W 30/182 701/69 |
| 2014/0067219 A1* | 3/2014 | Stares | ................ | B60K 17/34 701/69 |
| 2014/0074368 A1* | 3/2014 | Stares | ................ | B60K 17/34 701/69 |
| 2014/0236443 A1* | 8/2014 | Rodrigues | ................ | B60K 28/165 701/69 |
| 2015/0321554 A1* | 11/2015 | Oram | ................ | F16D 11/14 192/69.9 |
| 2016/0039407 A1* | 2/2016 | Ortmann | ................ | B60K 6/365 477/20 |
| 2017/0057506 A1* | 3/2017 | Jerger | ................ | B60W 10/06 |
| 2017/0120917 A1* | 5/2017 | Gibson | ................ | B60W 10/06 |
| 2017/0130832 A1* | 5/2017 | Pritchard | ................ | F16H 57/0435 |
| 2017/0225564 A1* | 8/2017 | Christensen | ................ | B60K 23/08 |
| 2017/0246953 A1* | 8/2017 | Girlando | ................ | B60K 17/35 |
| 2018/0290656 A1* | 10/2018 | Smith | ................ | B60T 8/322 |
| 2018/0351391 A1* | 12/2018 | Park | ................ | H02J 5/005 |
| 2019/0143978 A1* | 5/2019 | Pandit | ................ | B60K 23/0808 701/69 |
| 2020/0109753 A1* | 4/2020 | Northrup | ................ | B60K 23/0808 |

OTHER PUBLICATIONS

Coordinated engine-start control of single-motor P2 hybrid electric vehicles with respect to different driving situations X Xu, X Wu, M Jordan, P Dong, Y Liu—Energies, 2018—mdpi.com (Year: 2018).*

Concept of Reactivity Controlled Compression Ignition on a Single Cylinder Automotive Engine K Virdir—2019—tudr.thapar.edu (Year: 2019).*

A review of wireless power transfer for electric vehicles: Prospects to enhance sustainable mobility Z Bi, T Kan, CC Mi, Y Zhang, Z Zhao, GA Keoleian—Applied Energy, 2016—Elsevier (Year: 2016).*

Research on Super Capacitor Voltage Balancing of Electric Vehicle Charging Stations; Dongyang Sun;Fengjiang Wu;Lizhi Sun; Yuanbo Zhang; 2015 IEEE Vehicle Power and Propulsion Conference (VPPC); IEEE Conference Paper. (Year: 2015).*

Facilitating a Generic Communication Interface to Distributed Energy Resources: Mapping IEC 61850 to RESTful Services Anders Bro Pedersen; et al; 2010 First IEEE International Conference on Smart Grid Communications; IEEE Conference Paper. (Year: 2010).*

A Novel Type of Dynamic Wireless Power Transferred Scooter System with EDLC Storage Unit; Taisei Ando;Hideki Omori;Noriyuki Kimura;Toshimitsu Morizane; 2019 IEEE PES Asia-Pacific Power and Energy Engineering Conference (APPEEC); IEEE Conference Paper. (Year: 2019).*

Distributed battery system with wireless control and power transfer—A concept introduction; Jaber A. Abu Qahouq;Yuan Cao; 2018 IEEE Applied Power Electronics Conference and Exposition (APEC); IEEE Conference Paper. (Year: 2018).*

Low cost high efficiency DC-DC converter for fuel cell powered auxiliary power unit of a heavy vehicle; R. Sharma;Hongwei Gao; IEEE Transactions on Power Electronics; vol. 21, Issue: 3; IEEE Journal Article. (Year: 2006).*

Compactly Assembled Transmitting and Receiving Modules with Shield for Capacitive Coupling Power Transfer System; Aam Muharam;Mitsuru Masuda;Reiji Hattori;Abdul Hapid; 2019 IEEE PELS Workshop on Emerging Technologies: Wireless Power Transfer (WoW); IEEE Conference Paper. (Year: 2019).*

A New Type of High-Power Wireless Power Transfer with a Superimposed Communication by a Phase-Shifted Synchronous-Rectifier; Tatsuya Takahashi et al.; 2018 IEEE International Power Electronics and Application Conference and Exposition (PEAC) IEEE Conference Paper. (Year: 2018).*

Charging Infrastructure Design for In-motion WPT Based on Sensorless Vehicle Detection System; Katsuhiro Hata et al.; 2019 IEEE PELS Workshop on Emerging Technologies: Wireless Power Transfer (WoW); IEEE Conference Paper. (Year: 2019).*

* cited by examiner

POWER TRANSFER UNIT MAINTENANCE

BACKGROUND

In two-wheel drive vehicles, a powertrain system of a vehicle may be coupled to one drive axle to deliver torque to the wheels thereof. In at least some all-wheel drive vehicles, a power transfer unit may selectively engage a second drive axle so that, when engaged, torque can be delivered to four wheels rather than just two wheels. When the power transfer unit is not used for a period of time, actuation components within the PTU may become stuck or inoperable, thereby unable to function as required.

DETAILED DESCRIPTION

A powertrain system for a vehicle is described that includes a vehicle driveline system; one or more methods of using the vehicle driveline system(s) are also described. According to one illustrative example, a method for determining whether to execute a power transfer unit (PTU) maintenance task includes: determining at least one of the following: a communication error, a read-memory error, or an absence of a PTU shift between a two-wheel drive (2WD) mode and an all-wheel drive (AWD) mode for a threshold amount of vehicle operation; determining that a vehicle ignition state is not in a RUN state; and based on both determinations, executing the task. Examples of vehicle operation include a distance traveled during an ignition cycle or a global operation time, as described below.

According to at least one example of the method, the task comprises moving actuator components of the PTU.

According to at least one example of the method, the task comprises moving a driving member of the actuator of the PTU relative to a driven member.

According to at least one example of the method, the threshold amount of vehicle operation comprises either measuring vehicle travel distance or a global operation time.

According to at least one example of the method, the method further comprises: based on executing the task: resetting a distance counter that measures vehicle mileage, resetting a counter associated with the global operation time, or both.

According to at least one example of the method, the method further comprises: executing the task during an extended_ON mode which provides electrical power for a computer processor when the ignition state is an OFF or an accessory (ACC) state.

According to at least one example of the method, the method further comprises: aborting the task based on determining a change in the ignition state or a PTU failure mode.

According to at least one example of the method, the method further comprises: storing an indication of a PTU maintenance event in non-volatile memory so that the task may be executed in response to a subsequent ignition cycle.

According to at least one example of the method, the communication error comprises one of: a connection failure, a node failure, or an error message over a communication network connection.

According to at least one example of the method, the read-memory error comprises one of: an inability of a computer processor to read data stored in computer memory; a memory error message indicating that at least a portion of the computer memory is corrupted; or reading data from the computer memory, and determining that one or more data values are out-of-range.

According to at least one example of the method, the absence of the PTU shift between the 2WD mode and the AWD mode for the threshold amount of vehicle operation comprises one of: (a) comparing a distance counter value ($\Delta OV$) with a mileage threshold, wherein the distance counter value ($\Delta OV$) comprises a difference of a current odometer value (COV) and a reset odometer value (ROV); or (b) comparing a global operation time value ($\Delta GOTV$) with a global operation time threshold, wherein the global operation time value ($\Delta GOTV$) comprises a difference of a current global operation time value (CGOTV) and a reset global operation time value (RGOTV).

According to at least one example of the method, the absence of the PTU shift between the 2WD mode and the AWD mode for the threshold amount of vehicle operation comprises: incrementing a counter in response to any of the following: (a) determining that a requested driver mode is the 2WD mode, determining that the PTU is in the AWD mode, and unsuccessfully attempting to move the PTU to the 2WD mode; (b) determining that the requested driver mode is the AWD mode, determining that the PTU is in the 2WD mode, and unsuccessfully attempting to move the PTU to the AWD mode; (c) determining that the requested driver mode is the 2WD mode and determining that the PTU is already in the 2WD mode; or (d) determining that the requested driver mode is the AWD mode and determining that the PTU is already in the AWD mode.

According to at least one example of the method, the PTU is coupled to a manual transmission.

According to at least one example, a computer is disclosed that comprises a processor and memory storing instructions executable by the processor, wherein the instructions comprises any combination of the examples above.

According to another example, a system for performing a power transfer unit (PTU) maintenance task is described that comprises: a processor; and memory storing instructions executable by the processor, the instructions comprising, to: determine an absence of a PTU shift for a distance threshold or a global operation time threshold; then, determine that a vehicle ignition state is not in a RUN state; and then, execute the task.

According to at least one example of the system, the instructions further comprise: prior to determining that the ignition state is not the RUN state, determine a PTU shift between a two-wheel drive (2WD) mode and an all-wheel drive (AWD) mode; and then, reset at least one counter associated with the distance threshold or the global operation time threshold.

According to at least one example of the system, the task comprises moving one or more components of an actuator of the PTU between a connected and disconnected state.

According to at least one example of the system, the instructions further comprise, to: while the ignition state is the RUN state, determine a communication error or a read-memory error; then, determine that the ignition state is not in the RUN state and execute the task.

According to at least one example of the system, the instructions further comprise, to: execute the task during an extended_ON mode which provides electrical power for the processor when the ignition state is an OFF state.

According to at least one example of the system, the absence of the PTU shift for the distance threshold or the global operation time threshold further comprises an instruction, to: increment a counter in response to any of the following: (a) determining that a requested driver mode is a two-wheel drive (2WD) mode, determining that the PTU is in an all-wheel drive (AWD) mode, and unsuccessfully attempting to move the PTU to the 2WD mode; (b) determining that the requested driver mode is the AWD mode, determining that the PTU is in the 2WD mode, and unsuccessfully attempting to move the PTU to the AWD mode; (c) determining that the requested driver mode is the 2WD mode and determining that the PTU is already in the 2WD mode; or (d) determining that the requested driver mode is the AWD mode and determining that the PTU is already in the AWD mode.

According to at least one example of the system, the system further comprises: the PTU and a computer that comprises the processor and memory.

According to at least one example, a computer program product is disclosed that comprises a computer readable medium storing instructions executable by a computer processor, wherein the instructions comprises any combination of the method or system examples above.

Figure 1:
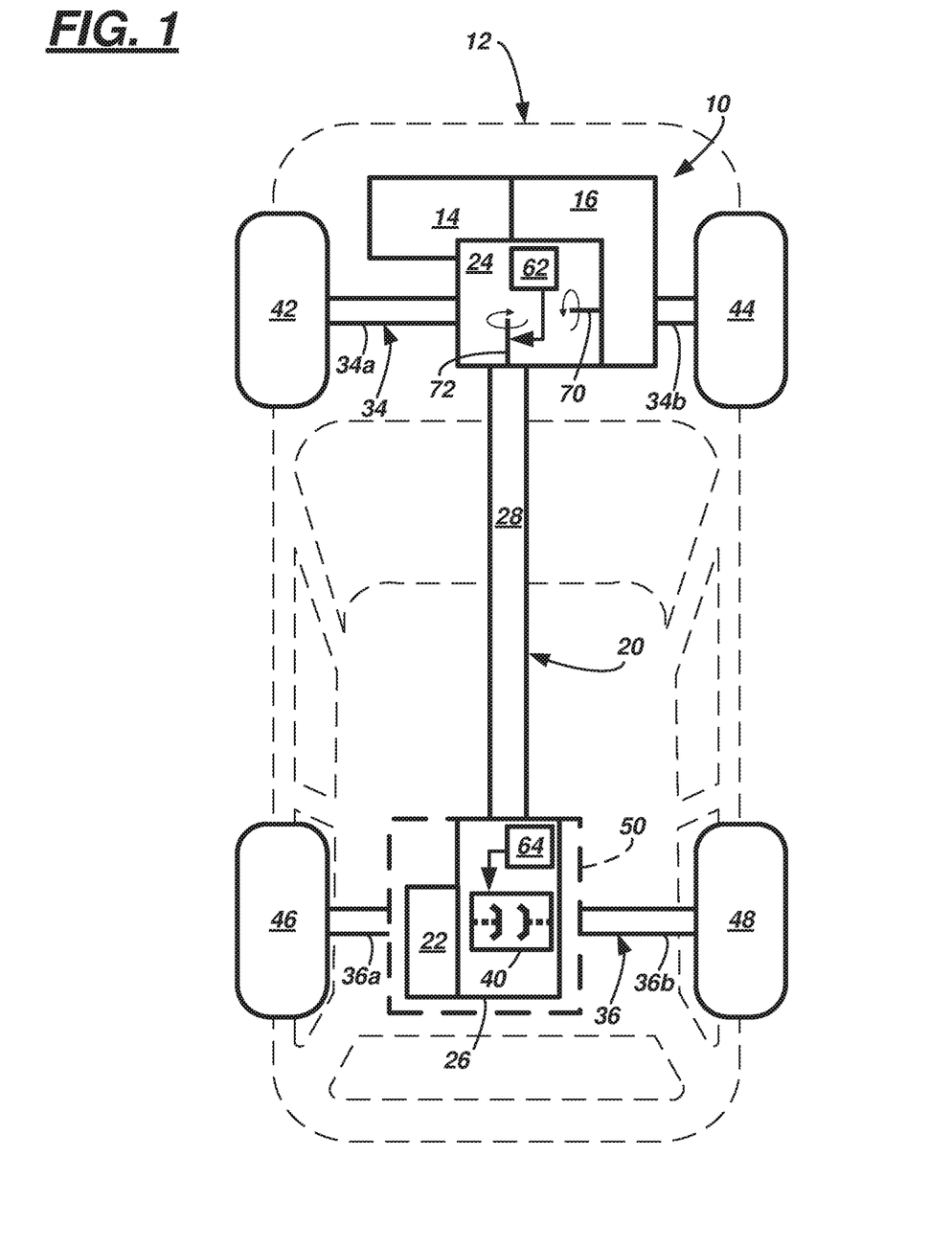
FIG. 1 is a schematic view of a vehicle powertrain system.

Now turning to the figures, wherein like numerals indicate like parts throughout the several views, there is shown a powertrain system 10 for a vehicle 12 that includes an engine 14, a gearing system 16 (e.g., such as a transaxle), and a driveline system 20 which may comprise a computer 22 and a power take-off unit (PTU) 24 (e.g., also called a power transfer unit) coupled to the gearing system 16 and also to a secondary drive unit (SDU) 26 via a drive shaft 28. The vehicle 12 further may comprise a primary axle 34 driven by the engine 14 and gearing system 16 and a secondary axle 36 selectively driven by the engine 14 and gearing system 16 via the driveline system 20. The description below and the accompanying illustrations show primary axle 34 as a front drive axle of vehicle 12 and secondary axle 36 as a drive rear axle thereof; however, this is not required (for instance, in other examples, the secondary axle 36 could be located forward of primary axle 34).

According to at least one example, the computer 22 of the driveline system 20 is programmed to execute a set of instructions for performing onboard maintenance for the PTU 24 when an ignition state of engine 14 is not in a RUN state (e.g., sometimes referred to as an ON state) and not in a START state (e.g., used to trigger a start of engine 14). For example, the vehicle 12 may have a plurality of ignition states such as an OFF state (e.g., sometimes referred to as a LOCK state), an accessory (ACC) state, the START state, and the RUN state. Some vehicles may be equipped with additional ignition states (e.g., such as a PREHEAT state for warming the engine 14), and these additional states also are contemplated herein. According to at least one example, in the RUN state, the PTU 24 may be actuated to facilitate vehicle operation in a two-wheel drive mode or an all-wheel drive mode, wherein, in the OFF, ACC, PREHEAT, or START states, the PTU 24 typically is not shifted between two-wheel and all-wheel drive modes. In at least one example, computer 22 may be programmed to determine a maintenance event (e.g., based on one or more maintenance triggers), determine that the vehicle ignition state has changed from RUN to OFF or ACC, and keep computer 22 awake (e.g., in an extended_ON mode) so that a maintenance task for the PTU 24 may be executed prior to computer 22 entering an OFF or ACC state. As used herein, the computer 22 determining a PTU maintenance event means that the computer 22 has determined at least one condition indicating a PTU maintenance task should be executed (e.g., as discussed below, conditions may include determining that a counter value is larger than a threshold, determining a communication error between driveline components, determining a read-memory error of computer 22, and the like, just to name a few). As used herein, the computer 22 executing a maintenance task means that the computer 22 controls movement of PTU components (e.g., such as an actuator and/or its sub-components, as described below) within a sealed housing (not shown) for the purpose of distributing lubricant around and/or between such moving PTU components. Lubricant may comprise any suitable fluid for reducing friction between and/or cooling components which move into and out of contact with one another (e.g., a non-solvent transmission fluid).

Exemplary vehicle 12 and powertrain system 10 are described below. Thereafter, an exemplary computer process will be described—e.g., illustrating executable instructions of computer 22 used to control the driveline system 20.

In FIG. 1, vehicle 12 is shown as a passenger car; however, vehicle 12 could also be a truck, sports utility vehicle (SUV), recreational vehicle, bus, or any other suitable vehicle that comprises the powertrain system 10. The vehicle 12 may be comprise wheels, continuous track, a combination thereof, or the like. The powertrain system 10 may be carried by a frame, a unibody, etc. of the vehicle 12—e.g., in accordance with techniques known in the art.

The primary and secondary axles 34, 36 of vehicle 12 may be coupled to wheels 42, 44, 46, 48. More particularly, primary axle 34 may comprise halfshafts 34a, 34b which are coupled to wheels 42, 44, respectively. And secondary axle 36 may comprise halfshafts 36a, 36b which are coupled to wheels 46, 48, respectively. In this manner, wheels 42-48 may rotate independent of one another and/or at different rates of speed.

In at least the illustrated example, the primary axle 34 is located forward of secondary axle 36, and primary axle 34 is coupled directly to gearing system 16. Correspondingly, secondary axle 36 is coupled indirectly to gearing system 16 via PTU 24, drive shaft 28, and SDU 26 (e.g., which may include a clutch 40). Again, this arrangement is merely an example; other arrangements exist including those wherein the secondary axle is located vehicle forwardly of the primary axle, wherein the engine 14 and/or gearing system 16 are located vehicle centrically or vehicle rearwardly, wherein vehicle 12 comprises three or more axles, wherein two or more secondary axles are used, wherein a combination of these arrangements is used, etc. Thus, while the SDU 26 may be a rear drive unit in the illustrations; this is not required (e.g., it could be a front drive unit in other examples).

Powertrain system 10 may be any power delivery system used to propel the vehicle 12 that includes the engine 14 and gearing system 16. As will be described more below, system 10 may comprise a vehicle having front-wheel drive (FWD) or rear-wheel drive (RWD) capability, plus selective all-wheel drive capability. Again, for purposes of illustration only, FIG. 1 illustrates vehicle 12 selectively operable in a two-wheel drive (2WD) mode and an all-wheel drive (AWD) mode (i.e., when the SDU 26 is engaged). As used herein, the phrase all-wheel drive (AWD) mode is used broadly to include various types of all-wheel drive implementations; thus, for example the phrase all-wheel drive (AWD) mode includes four-wheel drive (4WD) mode and the like.

Engine 14 of powertrain system 10 may be any suitable motor or combination of motors which deliver rotational kinetic energy to the gearing system 16—which energy ultimately is deliverable to the wheels 42-48 via mechanical linkages. Non-limiting engine examples include combustion engines, electric engines, hybrid-electric engines, etc., just to name a few.

Gearing system 16 of powertrain system 10 may comprise a transmission mechanically coupled to engine 14 which may be used to create different gear ratios allowing different trade-offs between torque delivery and rotational speed. The gearing system 16 may comprise a so-called transaxle; e.g., a transaxle may comprise multiple transmission gears (not shown) and a differential (not shown) coupled to each of halfshafts 34a, 34b. Of course, other types of transmission systems may be used instead. According to one non-limiting example, the gearing system 16 comprises a manual transmission; as used herein, a manual transmission comprises a clutch which may be engaged and disengaged via vehicle user (e.g., driver) control to regulate torque transfer from the engine 14 to the vehicle wheel(s), track, etc. via the driveline system 20.

Driveline system 20 may form a portion of powertrain system 10—e.g., being coupled to the gearing system 16. According to one example, driveline system 20 may comprise the computer 22, power take-off unit (PTU) 24, drive shaft 28, and secondary drive unit (SDU) 26, as discussed above. According to the illustrated example, engagement between gearing system 16 and PTU 24 may be used to change torque delivery to each of wheels 42, 44, 46, 48—e.g., changing from the 2WD mode to the AWD mode. Similarly, disengagement of the PTU 24 from the gearing system 16 may change the vehicle 12 from the AWD mode to the 2WD mode. Each driveline system component will be described in turn.

Figure 2:
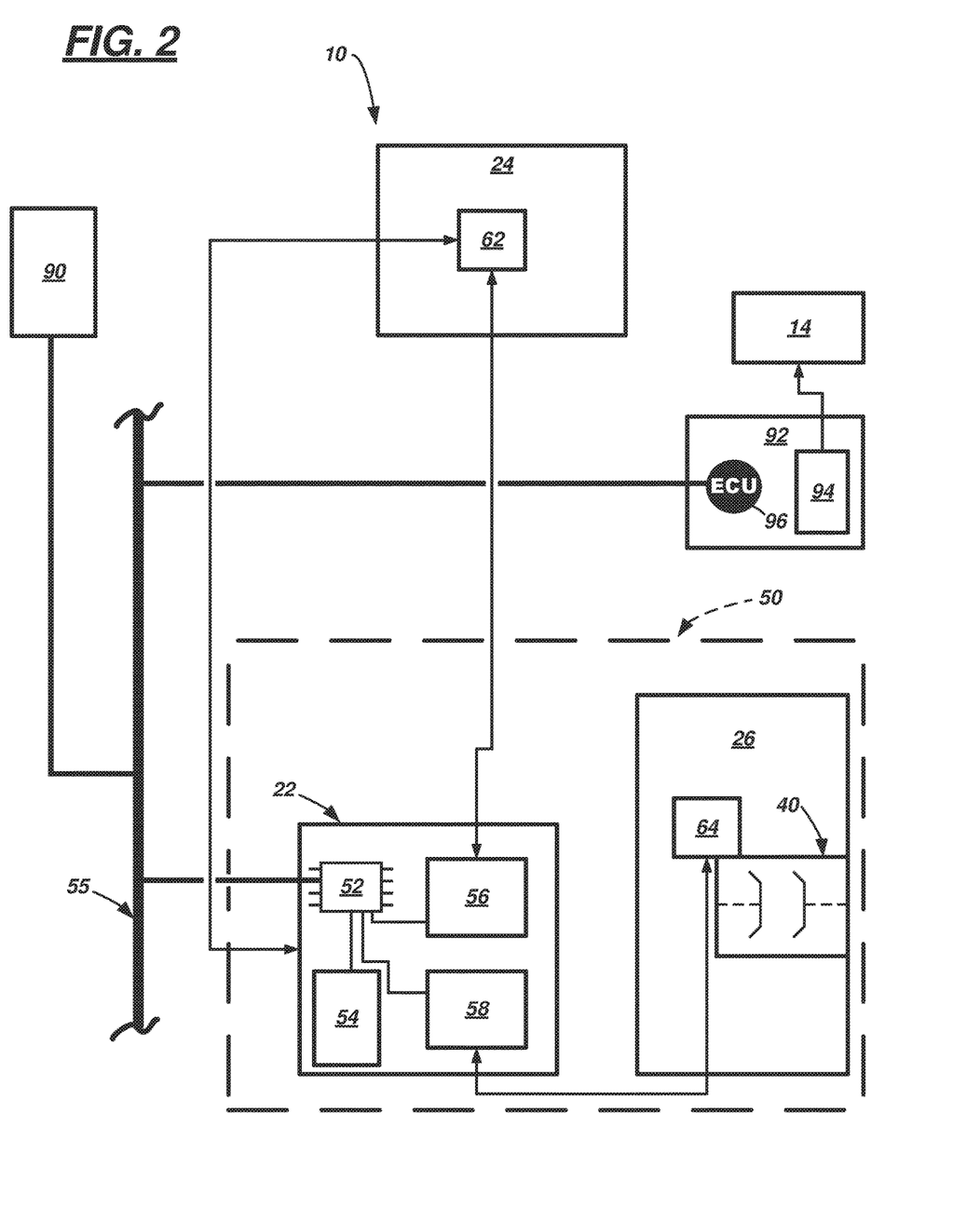
FIG. 2 is an electrical schematic view of a portion of the powertrain system shown in FIG. 1.

Turning now to FIG. 2, an electrical architecture diagram of vehicle 12 is shown that includes computer 22. Computer 22 comprises a single computer or multiple computers (e.g., which may or may not be shared with other vehicle systems and/or subsystems). Computer 22 is programmed—at least in part—to monitor sensor data from and/or control aspects of the PTU 24 and/or to monitor sensor data from and/or control aspects of the SDU 26. According to at least one example, computer 22 and SDU 26 share a common housing and collectively comprise a secondary drive module (SDM) 50 (shown in phantom); however, this is not required. In another example, hardware of computer 22 and PTU 24 may share a common housing. Or for example, hardware of computer 22 may be partitioned from SDU 26 and PTU 24 and/or combined with other vehicle components. In addition, in other examples, the computer 22 is located elsewhere in vehicle 12—e.g., not adjacent to or within the same module as SDU 26. Other arrangements are also possible.

Computer 22 comprises a processor 52 and memory 54—and in some examples also may comprise a PTU control circuit 56 and a SDU control circuit 58. Processor 52 can be any type of device capable of processing electronic instructions; non-limiting examples include a microprocessor, a microcontroller or controller, an application specific integrated circuit (ASIC), etc.—just to name a few. Processor 52 may be coupled electronically to memory 54 and circuits 56, 58. In general, computer 22 may be programmed to send data to and/or receive data from circuits 56, 58, as well as to execute digital instructions, which may be stored in memory 54, which enable the computer 22, among other things, to determine a maintenance event and execute instructions to perform a PTU maintenance task. Illustrative programmable instructions stored in memory 54 and executable by processor 52 will be discussed in greater detail below.

Memory 54 may include any non-transitory computer usable or readable medium, which may include one or more storage devices or articles. Exemplary non-transitory computer usable storage devices include conventional hard disk, solid-state memory, random-access memory (RAM), read-only memory (ROM), erasable programmable read-only memory (EPROM), electrically erasable programmable read-only memory (EEPROM), as well as any other volatile or non-volatile media. According to at least one example, memory 54 comprises EEPROM. And in at least one example, EEPROM memory 54 is used to store counter data and flag data associated with the maintenance event; thus, such data may be recalled from memory 54 when computer 22 boots up and thus may be used by processor 52 to determine whether and when to trigger a maintenance event.

Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 54 may store one or more computer program products which may be embodied as software, firmware, or other programming instructions executable by the processor 52.

PTU control circuit 56 may comprise any suitable electronics for controlling an actuator 62 of PTU 24 (discussed below), any suitable electronics for sensing voltage, current, temperature, or other conditions at the PTU 24, or a combination thereof. Similarly, the SDU control circuit 58 comprise any suitable electronics for controlling an actuator 64 (shown in FIGS. 1, 2 and discussed below) of SDU 26, any suitable electronics for sensing voltage, current, temperature, or other conditions at the SDU 26, or a combination thereof. Accordingly, computer processor 52 may execute instructions enabling it to control one or both of circuits 56, 58 to carry out one or more of the processes described herein.

Computer 22 may be coupled to a wired or wireless communication network connection 55 which permits communication between computer 22 and other electronic devices. Network connection 55 may include one or more of a controller area network (CAN) bus, Ethernet, Local Interconnect Network (LIN), a fiber optic connection, or the like—just to name a few non-limiting examples. In some examples, connection 55 comprises one or more discrete connections, a bus connection, or a combination thereof. According to at least one example, network connection 55 comprises a CAN bus having CAN bus signals which are used by computer 22 and other devices for intra-vehicle communication.

Computer 22 may be programmed to determine communication errors received via or at connection 55. Non-limiting examples of communication errors include malfunctions of or error messages over the network connection 55. For example, computer 22 may be programmed with instructions to detect a CAN bus error based on detecting a connection failure (e.g. computer 22 being unable to communicate with another networked device on the bus), a node failure (e.g., receiving returned values indicating an error), a combination thereof, or the like. Further, computer 22 may be programmed with instructions to detect pre-configured error messages (e.g., also referred to herein as communication errors) on the bus or other type of network connection. Other examples of communication errors may be determined by computer 22 as well.

Figure 1A:
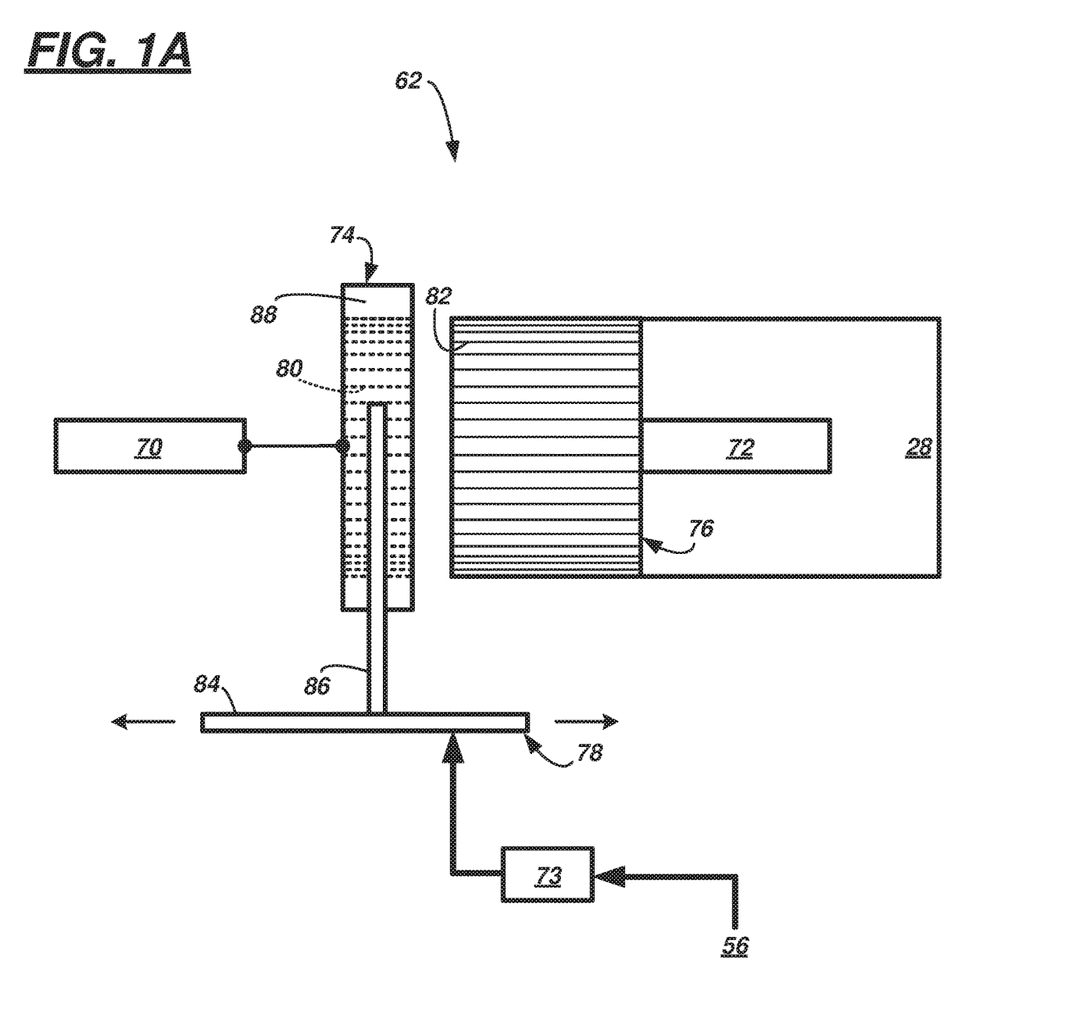
FIG. 1A is a schematic view of an example of an actuator for a power-transfer unit in the system.

As shown in FIGS. 1, 1A and 2, PTU 24 comprises any suitable hardware component(s) that receive input torque from gearing system 16 and provide output torque to an auxiliary hardware device. In the illustrated example, the PTU 24 provides output torque to at least the SDU 26 via drive shaft 28. For purposes of illustration only (and not intending to be limiting), PTU 24 may comprise an input shaft 70 that is configured to receive a torque input from gearing system 16 and at least one output shaft 72 which may deliver torque output to the SDU 26 via drive shaft 28 when actuator 62 is in an engaged state. As will be described more below, the actuator 62 may be moved between the engaged state and a disengaged state—e.g., controlled by PTU control circuit 56 (of computer 22). Thus, in the engaged state, torque may be transferred from the gearing system 16, through the input and output shafts 70, 72, through the drive shaft 28, through the SDU 26, and to the rear wheels 46, 48.

Actuator 62 may comprise any suitable electronically actuated mechanical linkage between the PTU 24 and the drive shaft 28. For example, the actuator 62 may comprise a switch 73 (e.g., such as a solenoid) which, when selectively actuated by the PTU control circuit 56, mechanically couples the PTU 24 and drive shaft 28 (into the engaged state). Similarly, the PTU 24 and drive shaft 28 may be de-coupled by the PTU control circuit 56 controlling switch 73 (e.g., thereby disengaging the drive shaft 28 and SDU 26).

FIG. 1A illustrates a non-limiting example of actuator 62 (in a disengaged state) that further includes a driving member 74 (which may be mechanically coupled to input shaft 70), a driven member 76 (which may be mechanically coupled to output shaft 72), and an engaging mechanism 78 that moves the driving member 74 to engage or disengage the driven member 76. According to at least one example, the driving member 74 comprises a dog clutch (exemplified in the illustrations as an annulus having one or more radially-inwardly-extending teeth 80), the driven member 76 comprises a gear (exemplified in the illustrations as an annulus having one or more radially-outwardly-extending teeth 82 that are sized and shaped to correspondingly engage teeth 80), and the engaging mechanism 78 comprise a rail 84 coupled to a shifter fork 86. For example, fork 86 may be fixed to both an outer surface 88 of the driving member 74 at one end and the rail 84 (at an opposite end). According to an exemplary operation, the control circuit 56 of computer 22—via network connection 55—axially may move rail 84 in a first direction thereby moving the dog clutch 74 to a disengaged state (e.g., as shown in FIG. 1A), and the control circuit 56 axially may move rail 84 in a second, opposite direction until the teeth 80 engage teeth 82, thereby moving the dog clutch 74 to an engaged state. In this latter instance, torque at input shaft 70 causes torque to be delivered at output shaft 72 (e.g., thus, driving SDU 26 via drive shaft 28) (e.g., in other words, an AWD mode).

One example of a bilateral actuator is shown and described above. However, unilateral and other bilateral actuator examples also exist. In these examples, one or more different components may be used; thus, the driving member 74, the driven member 76, and the engaging mechanism 78 are merely examples and are not required in all implementations.

Furthermore, the switch 73 is optional as well. For example, in manual transmission implementations, switch 73 may be omitted permitting a vehicle driver to manually operate the engaging mechanism 78 (e.g., moving to the first or second positions).

Returning to FIG. 1, drive shaft 28 may comprise any suitable mechanical linkage between the output shaft 72 of PTU 24 and SDU 26 which facilitates the delivery of torque to the SDU 26. Drive shaft 28 may comprise a rigid, elongated rod or member, coupling components such as universal joints, etc. (for coupling to PTU 24 and the SDU 26), and the like, all of which will be appreciated by those skilled in the art.

SDU 26 may comprise any suitable mechanical component at secondary axle 36 which is configured to receive torque from the drive shaft 28 (via clutch 40) and deliver said torque to the wheels 46, 48. SDU 26 may comprise a differential—e.g., so that halfshafts 36a, 36b (which are coupled thereto) permit wheels 46, 48 to rotate at different rates of speed and/or be delivered different amounts of torque. As discussed above, SDU 26 could be a rear drive unit or be located instead at a front axle (e.g., as a front drive unit; e.g., in rear-wheel drive vehicles).

SDU 26 also may comprise clutch 40 and actuator 64. Clutch 40 may comprise any suitable mechanical component interposed between the SDU 26 and either wheel 46, 48 which may be moved between an engaged state and a disengaged state by actuator 64. According to one example, clutch 40 may comprise a set of braking plates and a set of interstitially-located friction plates, as well as other components and features which facilitate movement of at least one set of the plates toward the other—e.g., so that the clutch moves between an engaged state and a disengaged state. Other aspects of a clutch, as well as assembly and operation techniques, are known in the art. Thus, when clutch 40 is in the engaged state, torque transferred from the PTU 24 and drive shaft 28 to the SDU 26 is then transferred to the wheels 46, 48. And no torque is transferred to wheels 46, 48 when the clutch 40 is in the disengaged state.

The clutch 40 may move between the engaged and disengaged states in response to actuation of actuator 64, and actuator 64 may be controlled by computer 22 (e.g., via SDU control circuit 58). According to at least one example, actuator 64 may be similar or identical to actuator 62; therefore, it will not be described in greater detail here.

FIG. 2 illustrates that vehicle 12 also may comprise a human-machine interface (HMI) module 90 and an ignition module 92, each of which may be coupled communicatively to network connection 55. The HMI module 90 may include any suitable input and/or output devices such as switches, knobs, one or more levers, controls, etc.—e.g., on a vehicle instrument panel, steering wheel, floorboard, console, etc. of vehicle 12—which may be coupled communicatively to computer 22. In one non-limiting example, HMI module 90 may comprise an interactive touch screen or display which provides powertrain information (e.g., including text, images, etc.) to the vehicle driver, and a switch or knob on the HMI module 90 permits the driver to switch between the 2WD mode and the AWD mode. The HMI module 90 further may be used to notify the driver that a PTU maintenance task is being executed. At least one example of HMI module 90 comprises a mechanical linkage (e.g., a manual lever to actuate a 2WD mode or an AWD mode); in this instance, the HMI module 90 may not be coupled to network connection 55.

The ignition module 92 may comprise an ignition switch 94 coupled to engine 14 and an electronic control unit (ECU) 96 that, among other things, monitors a vehicle ignition state of vehicle 12. Switch 94 may be moved to a plurality of positions that correspond with the different ignition states (discussed above). According to one non-limiting example, the switch 94 may be moved to any one of five positions which correspond with a RUN state, an ACC state, a PREHEAT state, a START state, or an OFF state. In the RUN state, the engine 14 may be powered regardless of whether the engine 14 is engaged to the gearing system 16. In the ACC state, one or more vehicle accessories (e.g., such as the HMI module 90) may be operable, even though the engine 14 may be OFF. In the PREHEAT state, the engine 14 may be unpowered; however, one or more heating elements (not shown) may be actuated to warm selected or predetermined components, fluids, etc. In the START state, the switch 94 may provide an electrical connection to enable the engine 14 to transition from the OFF state to the RUN state (e.g., providing power to electric motors in electric vehicle implementations, providing current to spark plugs in combustion engine implementations, or the like). And in the OFF state, the engine 14 may be unpowered or OFF. According to one example, when the ignition state is triggered to OFF, a substantial quantity of vehicle electrical systems power to OFF; some may revert to a LOW-POWER state—e.g., thereby conserving battery power for later start and/or operation. According to an example described in the process below, the computer 22 may determine a maintenance event during the RUN state and later—when the ignition state is not in the RUN state or the START state—perform a maintenance task based on the earlier determination.

ECU 96 of ignition module 92 may comprise a processor, memory, electronic circuit components, or a combination thereof. According to at least one example, at least some of the hardware of ECU 96 may be similar or identical to the processor and memory of computer 22; therefore, the components of ECU 96 will not be described in detail here. Of course, instructions executable by the ECU 96 may differ from those stored in computer 22. For example, ECU 96 may determine and/or control the position of switch 94, communicate via network connection 55, and the like. Ignition control techniques are generally known and will not be described in detail herein. Further, ECU 96 is optional; e.g., in at least one example, the ignition module 92 includes the switch 94 without ECU 96 (e.g., electrical signals via discrete network connections 55 may be coupled to computer 22).

Turning now to FIGS. 3-6, a process 300 is shown for determining a maintenance event at the PTU 24 and then performing a corresponding maintenance task for the PTU 24. The process 300 is illustrated as a flow diagram of blocks comprising instructions executable by processor 52 of computer 22. According to one example, the process may begin with block 320 which includes computer 22 receiving an indication that an ignition state of vehicle 12 is the RUN state. According to at least one example, the computer 22 receives this indication in the form of a message from the ignition module 92—e.g., received via the network connection 55.

Figure 3:
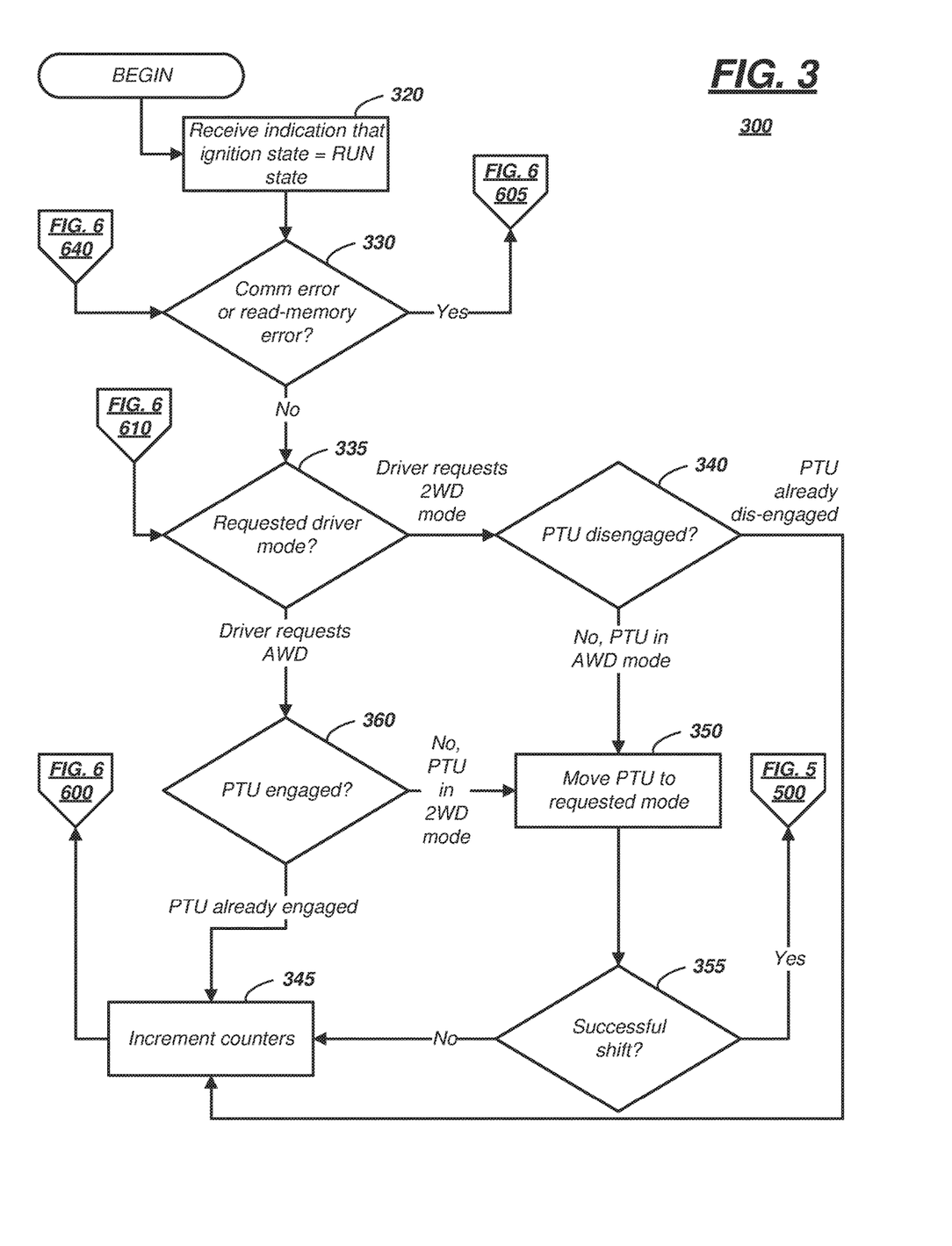
FIGS. 3-6 comprise a flow diagram illustrating a process for performing on-board maintenance for the system.

Block 330 follows block 320. In block 330, computer 22 may check or otherwise determine whether any communication errors exist or whether a read-memory errors exist. As discussed above, communication errors may comprise error message(s) received over connection 55, connection failure indication(s) (or connection failure determinations), node failure indication(s) (or node failure determinations), or the like. Read-memory errors may be any error associated with, derived from, or indicated by memory 54. According to one example, a read-memory error comprises an inability of processor 52 to read data stored in memory 54 (e.g., during an ignition cycle or while during an extended_ON mode (discussed below) that occurs when the ignition state may be OFF, ACC, or PREHEAT). According to another example, a read-memory error comprises a memory error message (e.g., that all or a portion of the memory 54 is corrupted). According to another example, a read-memory error comprises processor 52 reading data from the memory 54, however, determining that one or more data values (e.g., counter data or flag data) is out-of-range—i.e., is outside of predetermined upper and/or lower limit values. These are merely examples; other types of read-memory errors may exist. When at least one of a communication error or a read-memory error is determined in block 330, computer 22 may determine a maintenance event at the PTU 24 and thus determine to perform a maintenance task (as described more below). More particularly, when at least one of a communication error or a read-memory error is determined in block 330, process 300 may proceed to block 605. And when neither of a communication error nor a read-memory error is determined in block 330, process 300 may proceed to block 335.

In block 335, computer 22 may determine that a user (e.g., a driver) of vehicle 12 requests a driving mode (e.g., a 2WD mode, an AWD mode, etc.). Such a request may include a message or indication from HMI module 90 or the like. Further, the request may be explicit or implicit—e.g., an explicit request may comprise the driver positively actuating or otherwise actively selecting one of the levers, knobs, controls, etc. on HMI module 90, whereas an implicit request may comprise no positive actuation or selection of any portion of the HMI module 90 implying that the driver desires to maintain the what he or she believes to be the current driving mode. Thus, in block 335, when computer 22 determines that the 2WD mode is requested, the process 300 may proceed to block 340, and when, in block 335, computer 22 determines that the AWD mode is requested, the process 300 may proceed to block 360.

In block 340, computer 22 determines whether the PTU 24 is disengaged from the SDU 26. For example, processor 52 may receive an indication from PTU control circuit 56, wherein circuit 56 determines the position of the actuator 62 (e.g., via one or more sensors (not shown) at actuator 62). According to one example, computer 22 determines whether the engaging mechanism 78 (e.g., rail 84) is in the first position or the second position. If the computer 22 determines that the PTU 24 is already disengaged (e.g., rail 84 is in the first position), then process 300 proceeds to block 345. And if the computer 22 determines that the PTU 24 is engaged (e.g., the PTU 24 is in the AWD mode and rail 84 is in the second position), then process 300 proceeds to block 350.

Figure 4:
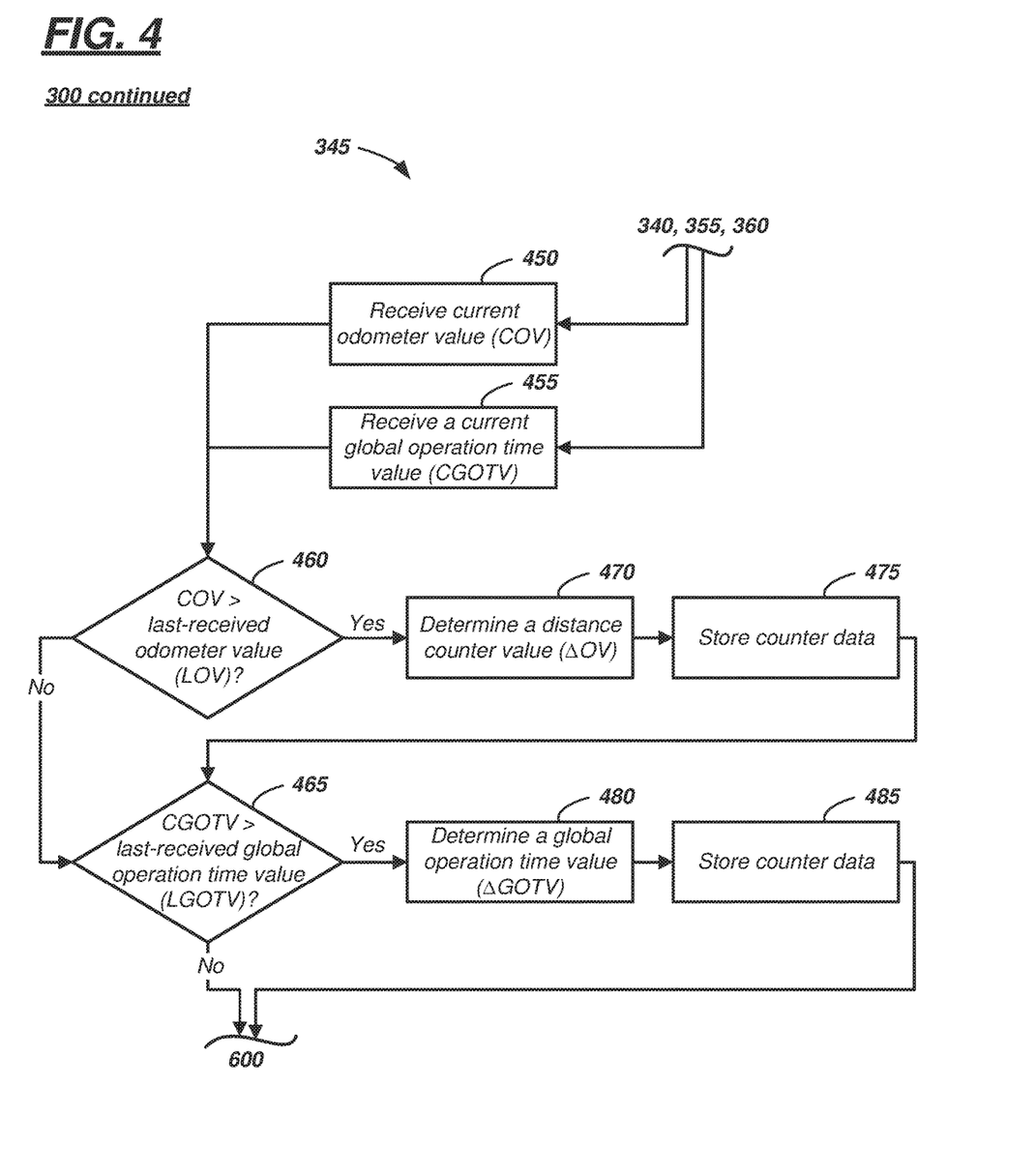

In block 345, one or more counters of computer 22 may be incremented. One example of block 345 is shown in FIG. 4, wherein block 345 is illustrated as a subroutine or subset of instructions. Accordingly, as described more below, any of blocks 340, 355, and 360 may flow to block 345, and block 600 may follow any instructions executed in block 345.

Accordingly, following block 340 (for example) computer 22 may receive—via network connection 55—a current odometer value (COV) (e.g., a current mileage value in block 450) and a current global operation time value (CGOTV) (e.g., a time parameter in block 455). In block 460 which follows blocks 450 and 455, computer 22 may determine whether the current odometer value (COV) is greater than a last-received odometer value (LOV). Following each time process 300 executes block 345, the last-received odometer value (LOV) may be set equal to the current odometer value (COV) and thereafter stored in memory 54. In block 460, when the current odometer value (COV) is greater than the last-received odometer value (LOV), then the process 300 proceeds to block 470, and when it is not greater than the last-received odometer value (LOV), then it proceeds to block 465.

In block 470, computer 22 may determine a distance counter value (e.g., a change in odometer value ($\Delta$OV)), wherein $\Delta$OV equals the current odometer value (COV) less a reset odometer value (ROV). See Equation (1).

$$\Delta OV = COV - ROV \qquad \text{Equation (1)}$$

The reset odometer value (ROV) may be reset each time distance and global operation time counters are reset, as described below. In block 475, counter data such as the last-received odometer value (LOV), the distance counter value ($\Delta$OV), and reset odometer value (ROV) may be stored in non-volatile memory 54 (e.g., and available to computer 22 after the current ignition cycle ends). As described more below, the distance counter value ($\Delta$OV) may be compared with a threshold at times during process 300; and when the distance counter value ($\Delta$OV) is larger than the threshold, then the computer 22 may determine to perform the PTU maintenance event to facilitate adequate moving of the PTU actuator 62 between an engaged (connected) and disengaged (disconnected) state. As described below, according to one example, moving the actuator 62 may comprise cycling between the engaged and disengaged state one or more times.

The global operation time counter may operate similarly to the distance counter except that it may monitor global operation time data and store counter data associated therewith. As used herein, a global operation time data is a collective measure of time (from a time of vehicle manufacture) measuring when the vehicle ignition state is in the RUN state, the ACC state, and/or the PREHEAT state. Accordingly, the global operation time value (CGOTV) received in block 455 is a current value of that collective measure of time. For example, in block 465, computer 22 may determine whether the current global operation time value (CGOTV) is greater than a last-received global operation time value (LGOTV). Similar to the LOV instruction described above, following each time process 300 executes block 345, the last-received global operation time value (LGOTV) may be set equal to the current global operation time value (CGOTV) and thereafter stored in memory 54. In block 465, when the current global operation time value (CGOTV) is greater than the last-received global operation time value (LGOTV), then the process 300 proceeds to block 480, and when it is not greater than the last-received global operation time value (LGOTV), then it proceeds to block 600.

In block 480, computer 22 may determine a global operation time value (e.g., a change in global operation time value ($\Delta$GOTV)), wherein $\Delta$GOTV equals the current global operation time value (CGOTV) less a reset global operation time value (RGOTV). The reset global operation time value (RGOTV) may be a time indicating when the last counter reset occurred. See Equation (2).

$$\Delta GOTV = CGOTV - RGOTV \qquad \text{Equation (2)}$$

The reset global operation time value (RGOTV) may be reset each time the distance and global operation time counters are reset, as described below. In block 485, counter data such as the last-received global operation time value (LGOTV), the global operation time value ($\Delta$GOTV), and reset global operation time value (RGOTV) may be stored in non-volatile memory 54 (e.g., and available to computer 22 after the current ignition cycle ends). As described more below, the global operation time value ($\Delta$GOTV) may be compared with a threshold at times during process 300; and when the global operation time value ($\Delta$GOTV) is larger than the respective threshold, then the computer 22 may determine to perform PTU maintenance event to facilitate adequate moving of the PTU actuator 62 between an engaged (connected) and disengaged (disconnected) state.

Block 600—which follows block 345 (or more specifically, either of blocks 465 or 485)—will be described below. Returning to FIG. 3, recall that block 350 may follow block 340 (described above)—or may follow block 360 (described below). In block 350, computer 22—e.g., via control circuit 56—may attempt to move the PTU 24 to the requested mode. For example, when the request (in block 335) is for 2WD mode, then in block 350, the computer 22 may control the actuator 62 to disengage PTU 24. Similarly, when the request (in block 335) is for AWD mode, then in block 350, the computer 22 may control the actuator 62 to engage the PTU (e.g., enter AWD mode). Continuing with the present flow path (e.g., block 335 to block 340 to block 350), the computer 22 may attempt to disengage the PTU 24 from the SDU 26 (enter 2WD mode).

In block 355 which follows block 350, computer 22 may determine whether a successful PTU shift occurred. As used herein, a successful PTU shift may comprise moving the actuator 62 from the disengaged state to the engaged state, or vice-versa. In at least one example, a successful PTU shift further may comprise doing so within a predetermined interval of time—e.g., a PTU shift within a predetermined response time can improve the driver experience. In at least one example, an unsuccessful shift may comprise displacement of the actuator 62 less than a threshold amount; in the example shown in FIG. 1A, an unsuccessful shift may comprise moving the driving member 74 only partially between the first and second positions or the like. Another example of an unsuccessful shift may include moving the driving member 74 between the first and second positions; however, the predetermined interval being greater than a predetermined threshold. When the computer 22 determines a successful shift in block 355, then process 300 proceeds to block 500. And when the computer 22 determines an unsuccessful shift in block 355, then process 300 proceeds to block 345 (which has already been described above).

Turning now to block 360, recall process 300 may proceed to block 360 when the requested mode (block 335) is the AWD mode. Block 360 may be similar to block 340; therefore, it will not be described in detail again. When computer 22 determines that the PTU 24 is engaged already (e.g., rail 84 is in the second position), then process 300 may proceed to block 345 (e.g., and may increment the counter(s)). And when computer 22 determines that the PTU 24 is disengaged (e.g., the PTU 24 is in the 2WD mode; e.g., rail 84 is in the first position), then process 300 may proceed to block 350 (also previously described).

Figure 5:
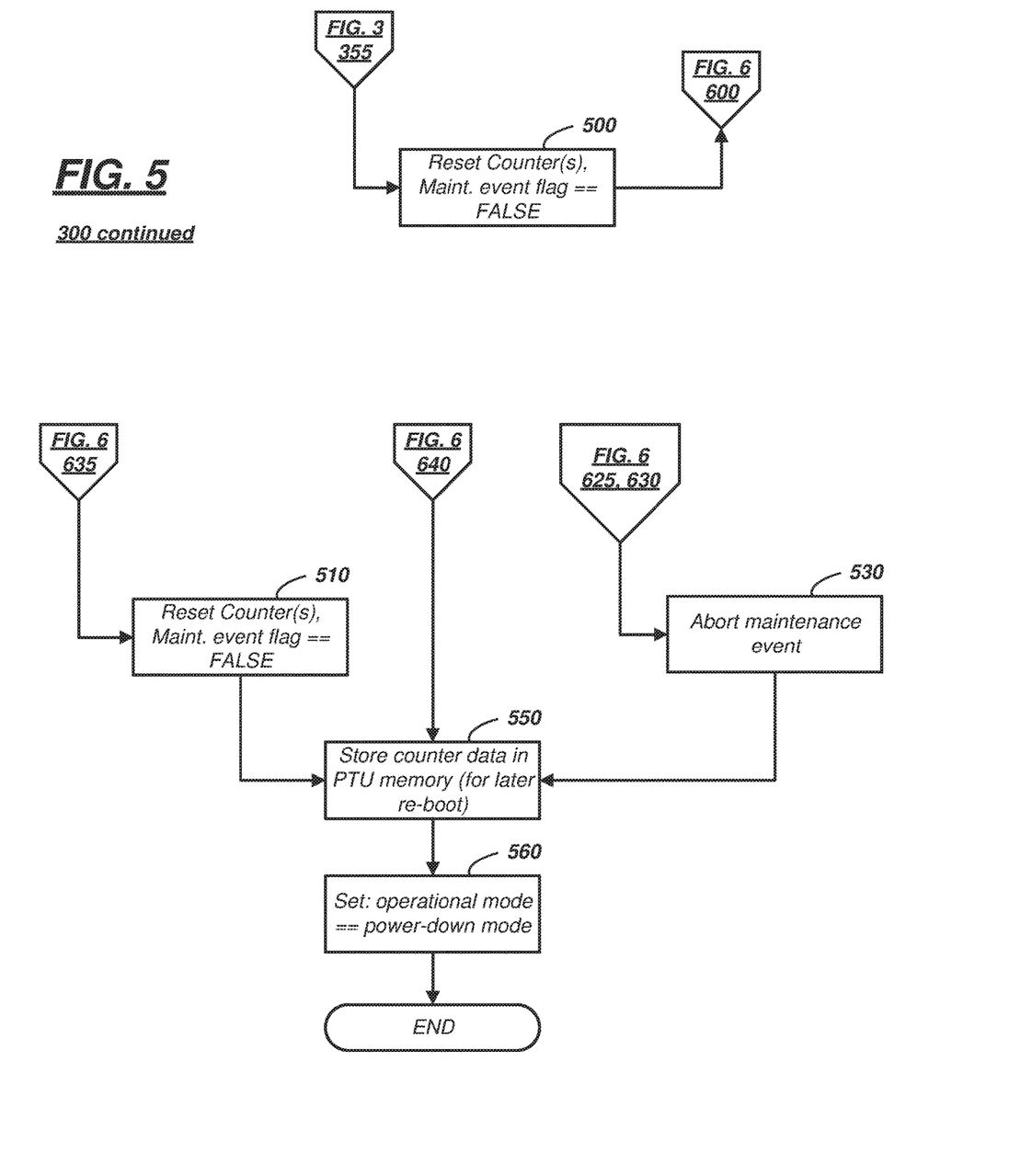

Turning now to FIG. 5, according to at least one implementation of block 500, computer 22 may reset the distance counter and the global operation time counter. To reset the distance counter, computer 22 may receive a current odometer value (COV) and set the reset odometer value (ROV) equal to this current odometer value (COV). In this manner, the distance counter value (ΔOV) is reset effectively to zero (e.g., see Equation (1)).

Resetting the global operation time counter may be carried out by setting the reset global operation time value (RGOTV) to the current global operation time value (CGOTV). In this manner, the global operation time value (ΔGOTV) is reset effectively to zero as well (e.g., see Equation (2)).

Block 500 further may comprise setting a maintenance event flag to a FALSE value. As explained more below, when the value of this flag is TRUE, then computer 22 may determine a maintenance event for the PTU 24—e.g., and perform the maintenance event when the ignition state is other than RUN or START. It should be appreciated that in some instances during a current ignition cycle, the flag could be set to TRUE at one point, the process 300 could loop back and repeat at least some of blocks 330-360 thereafter changing the PTU 24 from the 2WD mode to the AWD mode (or vice-versa), and the flag could be set back to FALSE (e.g., without performing the maintenance event). Thus, according to one aspect of process 300, computer 22 determines instances when the PTU 24 does not move between 2WD and AWD modes for a predetermined measure of mileage or global operation time, and then attempts to move the components of the PTU actuator 62 by performing a maintenance event, as discussed more below.

It should be appreciated that a flag is merely one example and is not intended to be limiting. For example, the flag may be implemented as a state or condition storable in memory 54; or the flag may represent an electrical switch (e.g., a transistor) position ON or OFF or a switch within processor 52. Other examples also exist. Following block 500, the process 300 may proceed to block 600.

In block 600 (FIG. 6), computer 22 determines whether the counter(s) are greater than their respective thresholds. As discussed above, computer 22 may compare the distance counter value (ΔOV) to a calibratable mileage threshold and/or the global operation time value (ΔGOTV) to a calibratable global operation time threshold. According to one example, if either of the values are greater than their respective thresholds, then process 300 proceeds to block 605, and if neither of the values are greater than their respective thresholds, then process 300 proceeds to block 640.

Figure 6:
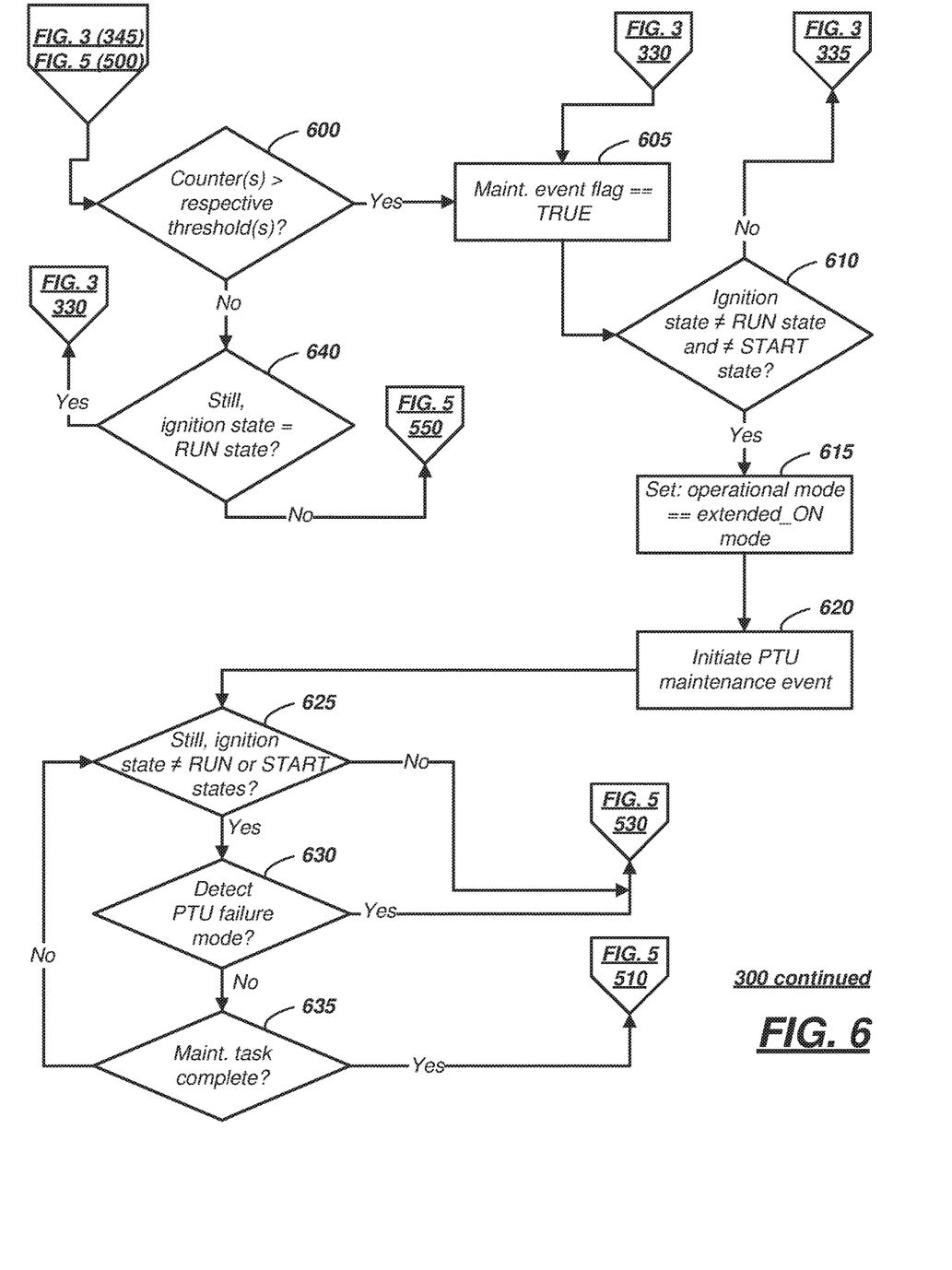

In block 605, the computer 22 determines the PTU maintenance event and accordingly may set the maintenance event flag to a TRUE value. (Note: FIG. 6 illustrates that process 300 may flow to block 605 from block 330 as well, as described above.)

In block 610 which follows, computer 22 may determine whether the ignition state does not equal the RUN state and does not equal the START state (e.g., alternatively, computer 22 could determine only whether the vehicle ignition state is not in the RUN state). When the vehicle 12 is operating in either the RUN or START state, the process 300 may loop back to block 335 (e.g., determining again the driver requested PTU mode). However, when the ignition state is not the RUN state and is not the START state—e.g., but instead one of the OFF state, the ACC state, or the PREHEAT state—then process 300 proceeds to block 615.

Typically, when the ignition state transitions from the RUN state to one of the OFF, PREHEAT, or ACC states, computer 22 would receive an indication to shut-down vehicle electronics; e.g., if the engine is OFF, there is typically no shifting between 2WD and AWD modes. In block 615, computer 22 may set an operational mode to an extended_ON mode (e.g., operates in a mode that overrides the typical vehicle electronics shut-down). Thus, in this extended_ON mode, PTU 24 may have limited functionality, and computer 22 may execute, among other things, the PTU maintenance task. In at least one example, the computer 22 (e.g., which may be located in the SDU 26 or elsewhere) and the actuator 62 remain at least partially powered.

In block 620 which follows, computer 22 may initiate the PTU maintenance task. As discussed above, a PTU maintenance task includes moving the actuator components of the PTU 24 (e.g., components such as, but not limited to, switch 73, rail 84, sifter fork 86, driving member 74, and driven member 76 which have intermeshing teeth 80, 82, respectively) between an engaged (connected) and disengaged (disconnected) state. According to one non-limiting example, computer 22 may move the actuator 62 from the first position to the second position (or vice-versa). In some examples, this movement may be reciprocated a predetermined quantity of times (e.g., for a bilateral actuator). In another example, movement of the actuator 62 in a single direction can adequately promote component function (e.g., for a unilateral actuator). In another example, computer 22 may command the maintenance task, and if the task is not executed within a predetermined period of time (e.g., indicating that the PTU components are unlubricated, locked-up, or have too much friction), then the maintenance task may be repeated one or more times—e.g., attempting to complete the task within the predetermined period of time.

Blocks 625-635 which follow block 620 may occur in any sequence or may occur at least partially concurrently. For example, in block 625, computer 22 may re-determine whether the ignition state still is not in the RUN or START state. If for example the driver again restarts the vehicle 12 and places the engine 14 in the RUN state, then (as discussed below) it may be desirable to abort the maintenance task because the driver may desire shift and/or use the functionality of the PTU 24. When the ignition state does not equal either of RUN or START, then the process 300 may proceed to block 630, and when if the ignition state now equals RUN or START, then the process 300 may proceed to block 530.

In block 630, computer 22 may determine whether the PTU 24 is experiencing a failure mode. Non-limiting examples of failure modes include: electrical power-draw errors at the PTU 24, PTU position errors, or the like. For example, non-limiting examples of power-draw errors include: a voltage level error (e.g., a voltage level, less than a predetermined value, greater than a predetermined value, or outside a threshold range); a current draw level error (e.g., a current draw less than a predetermined value, greater than a predetermined value, or outside a threshold range); a voltage or current stability error (e.g., a measurement of voltage or current for a period of time, wherein during the period, instantaneous values of the current or voltage vary positively or negatively more than a threshold amount); and the like. And for example, non-limiting examples of PTU position errors include: a state unknown error (e.g., an error indicating that a state of the PTU actuator 62 is unknown—i.e., it is unknown whether the PTU 24 is in an engaged state or a disengaged state); an actuator position error (e.g., an error indicating that the actuator 62 is stuck between the engaged and disengaged states); an out-of-range error (e.g., an error that can be derived from an electrical measurement of the output of actuator 62 indicating that the actuator 62 is outside a threshold range of motion); and the like. These are merely examples; other failure modes exist as well. When the PTU 24 is experiencing at least one failure mode, then the process 300 may proceed to block 530, and when PTU 24 is not experiencing a failure mode, then it may proceed to block 635.

In block 635, computer 22 may determine whether the PTU maintenance task is complete. When the maintenance task is complete, then the process 300 may proceed to block 510, and when the task is not complete, then process 300 may loop back to block 625 and continue to loop through blocks 625-635.

FIG. 6 also illustrates that process 300 may include block 640 which may follow block 600 when computer 22 determines that the counter(s) did not exceed their respective threshold(s). In block 640, the computer 22 may determine that the ignition state of vehicle 12 is still the RUN state. When the ignition state still equals the RUN state, then the process 300 may loop back to block 330 (e.g., and checks again for communication and/or read-memory errors), and when the ignition state is something other than the RUN state, then process 300 may proceed to block 550, discussed below.

Returning to FIG. 5, process 300 also may include blocks 510, 530, 550, and 560. In block 510 (which may follow block 635 when the PTU maintenance task is completed), computer 22 may reset the distance counter and the global operation time counter, and computer 22 may set the maintenance event flag to a FALSE value again. According to one example, block 510 may be identical to block 500; thus, it will not be described again in detail. Following block 510, the process may proceed to block 550.

In block 550 (which may follow any one of blocks 510, 530, or 640), computer 22 may store counter data (e.g., LOV, ΔOV, ROV, LGOTV, ΔGOTV, RGOTV, etc.) in PTU memory 54 so that they may be used later when the PTU computer 22 is rebooted (e.g., at a subsequent ignition cycle). According to one example, counter data is stored in EEPROM (or other suitable non-volatile devices of memory 54), and flag data is stored in RAM (or other suitable volatile devices of memory 54).

In block 560 which may follow block 550, the operational mode of computer 22 may change to a power-down mode. In one example, this may be triggered by the ignition cycle changing to OFF—e.g., vehicle 12 may be configured to command vehicle control modules and electronics to shut down when the ignition cycle is OFF (or transitions to OFF) to conserve energy. In other examples, computer 22 executes an instruction to enter the power-down mode only after storing data in block 550 (and/or after completing the PTU maintenance task in the extended_ON mode, discussed above). Accordingly, computer 22 powers down and the process 300 may end.

Block 530 (e.g., which may proceed from either of blocks 625 or 630) may comprise computer 22 aborting the PTU maintenance task. For example, as described above, when the maintenance task is interrupted before completion, computer 22 may cease operation of the PTU maintenance task and save the counter data in memory 54 in block 550 (which follows block 530) and then power down (block 560). In this example, the counter data is not reset—e.g., so that upon the next ignition cycle, after evaluating the counter data, flag will be set to the TRUE value and the computer 22 will identify that the PTU maintenance event still needs to be completed.

Thus, process 300 may be used to trigger execution of a PTU maintenance task when: (a) the computer 22 determines a communication error (e.g., the computer 22 may be unable to identify which mode the PTU 24 is in—e.g., as the actuator 62 may be unable to communicate with the computer 22); (b) the computer 22 determines a read-memory error (e.g., potentially suggesting that the counter and/or flag data may be invalid; and/or (c) the computer 22 determines that PTU 24 has not shifted or moved between 2WD and AWD for a predetermined amount of global operation time threshold or distance threshold (e.g., miles-driven threshold). Thus, when any one of these determinations is made, then a PTU maintenance task may be executed when the PTU 24 is not being used (e.g., when the engine 14 is not in the RUN state).

If the PTU 24 is shifted between 2WD and AWD modes before the distance counter reaches a threshold and/or the global operation time counter reaches its threshold, then no PTU maintenance task may be executed.

According to one example (of block 330 proceeding to block 605), even if the communication or read-memory error is resolved during the same ignition cycle, the flag having been set to TRUE (in block 605) may remain TRUE—e.g., until the PTU 24 is actuated successfully.

Thus, there has been described a powertrain system for a vehicle. The system includes a driveline system that can include a power-take off unit (PTU) and a computer. The computer may be programmed with instructions that enable it to determine a PTU maintenance event and perform a PTU maintenance task. According to one example, the computer may determine the PTU maintenance event by determining at least one of the following: a communication error, a read-memory error, or an absence of a PTU shift between a two-wheel drive (2WD) mode and an all-wheel drive (AWD) mode for a threshold amount of time or distance. Having determined the event, provided these conditions have not changed in the interim, the computer may determine to execute the PTU maintenance task based on: the PTU maintenance event determination and a determination that a vehicle ignition station is not in a RUN state.

In general, the computing systems and/or devices described may employ any of a number of computer operating systems, including, but by no means limited to, versions and/or varieties of the Windows Embedded Automotive operating system, the Microsoft Windows operating system, the Unix operating system, the AIX UNIX operating system, the Linux operating system, the Mac OSX and iOS operating systems, or the like. Examples of computing devices include, without limitation, an on-board vehicle computer or some other computing system and/or device on vehicle 12.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., such as computer 22), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. As described herein, the processor instructs vehicle components to actuate in accordance with the sensor data.

The memory (or data storage device) is implemented via circuits, chips or other electronic components and can include one or more of read only memory (ROM), random-access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method for determining whether to execute a power transfer unit (PTI) maintenance task, comprising:
determining at least one of the following: a communication error, a read-memory error, or an absence of a PTU shift between a two-wheel drive (2WD) mode and an all-wheel drive (AWD) mode for a threshold amount of vehicle operation;
determining that a vehicle ignition state is not in a RUN state; and based on both determinations, executing the task;
wherein the threshold amount of vehicle operation comprises measuring vehicle travel distance or a global operation time.

2. The method of claim 1, wherein the task comprises moving one or more components of an actuator of the PTU.

3. The method of claim 2, wherein the task comprises moving a driving member of the actuator of the PTU relative to a driven member.

4. A system for performing a power transfer unit (PTU) maintenance task, comprising:
a processor; and
memory storing instructions executable by the processor, the instructions comprising, to:
determine an absence of a PTU shift for a distance threshold or a global operation time threshold; then,
determine that a vehicle ignition state is not in a RUN state; and then, execute the task;
wherein the threshold amount of vehicle operation comprises measuring vehicle travel distance or a global operation time.

5. The method of claim 1, further comprising, based on executing the task: resetting a distance counter that measures vehicle mileage, resetting a counter associated with the global operation time, or both.

6. The method of claim 1, further comprising: executing the task during an extended_ON mode which provides electrical power for a computer processor when the ignition state is an OFF state.

7. The method of claim 1, further comprising: aborting the task based on determining a change in the ignition state or a PTU failure mode.

8. The method of claim 7, further comprising: storing an indication of a PTU maintenance event in non-volatile memory so that the task may be executed in response to a subsequent ignition cycle.

9. The method of claim 1, wherein the communication error comprises one of: a connection failure, a node failure, or an error message over a communication network connection.

10. The method of claim 1, wherein the read-memory error comprises one of: an inability of a computer processor to read data stored in computer memory; a memory error message indicating that at least a portion of the computer memory is corrupted; or reading data from the computer memory, and determining that one or more data values are out-of-range.

11. The method of claim 1, wherein the absence of the PTU shift between the 2WD mode and the AWD mode for the threshold amount of vehicle operation comprises one of:

(a) comparing a distance counter value (ΔOV) with a mileage threshold, wherein the distance counter value (ΔOV) comprises a difference of a current odometer value (COV) and a reset odometer value (ROV); or (b) comparing a global operation time value (ΔGOTV) with a global operation time threshold, wherein the global operation time value (ΔGOTV) comprises a difference of a current global operation time value (CGOTV) and a reset global operation time value (RGOTV).

12. The method of claim 1, wherein the absence of the PTU shift between the 2WD mode and the AWD mode for the threshold amount of vehicle operation comprises:
incrementing a counter in response to any of the following:
(a) determining that a requested driver mode is the 2WD mode, determining that the PTU is in the AWD mode, and unsuccessfully attempting to move the PTU to the 2WD mode;
(b) determining that the requested driver mode is the AWD mode, determining that the PTU is in the 2WD mode, and unsuccessfully attempting to move the PTU to the AWD mode;
(c) determining that the requested driver mode is the 2WD mode and determining that the PTU is already in the 2WD mode; or
(d) determining that the requested driver mode is the AWD mode and determining that the PTU is already in the AWD mode.

13. The method of claim 1, wherein the PTU is coupled to a manual transmission.

14. The system of claim 4, further comprising the PTU and a computer that comprises the processor and memory.

15. The system of claim 4, wherein the instructions further comprise, to: prior to determining that the ignition state is not the RUN state, determine a PTU shift between a two-wheel drive (2WD) mode and an all-wheel drive (AWD) mode; and then, reset at least one counter associated with the distance threshold or the global operation time threshold.

16. The system of claim 4, wherein the task comprises moving one or more components of an actuator of the PTU between a connected and disconnected state.

17. The system of claim 4, wherein the instructions further comprise, to: while the ignition state is the RUN state, determine a communication error or a read-memory error; then, determine that the ignition state is not in the RUN state and execute the task.

18. The system of claim 4, wherein the instructions further comprise, to: execute the task during an extended_ON mode which provides electrical power for the processor when the ignition state is an OFF state.

19. The system of claim 4, wherein the absence of the PTU shift for the distance threshold or the global operation time threshold further comprises an instruction, to:
increment a counter in response to any of the following:
(e) determining that a requested driver mode is a two-wheel drive (2WD) mode, determining that the PTU is in an all-wheel drive (AWD) mode, and unsuccessfully attempting to move the PTU to the 2WD mode;
(f) determining that the requested driver mode is the AWD mode, determining that the PTU is in the 2WD mode, and unsuccessfully attempting to move the PTU to the AWD mode;
(g) determining that the requested driver mode is the 2WD mode and determining that the PTU is already in the 2WD mode; or
(h) determining that the requested driver mode is the AWD mode and determining that the PTU is already in the AWD mode.

* * * * *

UNITED STATES PATENT AND TRADEMARK OFFICE
CERTIFICATE OF CORRECTION

PATENT NO. : 10,902,687 B2
APPLICATION NO. : 15/886197
DATED : January 26, 2021
INVENTOR(S) : Mehta Himanshu and Zhu Zihao Page 1 of 1

It is certified that error appears in the above-identified patent and that said Letters Patent is hereby corrected as shown below:

In the Claims

Column 18, in Line 11, replace "unit (PTI) maintenance" with -- unit (PTU) maintenance --.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*